(12) United States Patent
de Ledebur et al.

(10) Patent No.: US 12,001,229 B1
(45) Date of Patent: Jun. 4, 2024

(54) PNEUMATIC ELEVATOR WITH PRESSURE REGULATOR

(71) Applicants: Juan Carlos G. de Ledebur, Key Biscayne, FL (US); Stefan A. Gruber, Miami, FL (US); Patrick Andrew G. de Ledebur, Miami, FL (US)

(72) Inventors: Juan Carlos G. de Ledebur, Key Biscayne, FL (US); Stefan A. Gruber, Miami, FL (US); Patrick Andrew G. de Ledebur, Miami, FL (US)

( * ) Notice: Subject to any disclaimer, the term of this patent is extended or adjusted under 35 U.S.C. 154(b) by 0 days.

(21) Appl. No.: 18/514,093

(22) Filed: Nov. 20, 2023

(51) Int. Cl.
  *B66B 1/34* (2006.01)
  *B66B 1/28* (2006.01)
  *B66B 9/04* (2006.01)
  *B66B 11/04* (2006.01)
  *F16K 3/02* (2006.01)
  *G05D 7/00* (2006.01)

(52) U.S. Cl.
  CPC .............. *G05D 7/005* (2013.01); *B66B 1/28* (2013.01); *B66B 1/3423* (2013.01); *B66B 1/3453* (2013.01); *B66B 1/3469* (2013.01); *B66B 1/3492* (2013.01); *B66B 9/04* (2013.01); *F16K 3/0209* (2013.01)

(58) Field of Classification Search
  CPC .... B66B 1/02; B66B 1/06; B66B 1/08; B66B 1/12; B66B 1/14; B66B 1/28–30; B66B 1/32; B66B 1/3415; B66B 1/3423; B66B 1/3446; B66B 1/3453; B66B 1/3469; B66B 5/00; B66B 5/0006; B66B 5/0037; B66B 9/04; B66B 11/0423
  See application file for complete search history.

(56) References Cited

U.S. PATENT DOCUMENTS

| | | | | |
|---|---|---|---|---|
| 6,085,873 | A * | 7/2000 | Macchi | B65G 51/04 187/400 |
| 9,248,995 | B2 * | 2/2016 | Ascua | F16K 7/14 |
| 9,339,936 | B2 * | 5/2016 | Kearney | B25J 15/0616 |
| 2012/0180503 | A1 * | 7/2012 | Oikawa | F04B 37/08 137/526 |

* cited by examiner

*Primary Examiner* — Christopher Uhlir
(74) *Attorney, Agent, or Firm* — Leech Tishman Fuscaldo & Lampl

(57) ABSTRACT

A pressure regulator includes a fluid transfer chamber defining one or more apertures. A flow control element is disposed within the fluid transfer chamber and is movable with respect to the fluid transfer chamber. An actuator is secured to the flow control element and is operable to move the flow control element with respect to the fluid transfer chamber to control fluid flow through the apertures in the fluid transfer chamber.

4 Claims, 6 Drawing Sheets

PNEUMATIC ELEVATOR WITH PRESSURE REGULATOR

CROSS-REFERENCE TO RELATED APPLICATION n/a

FIELD

The present technology is generally related to pneumatic elevators and more particularly to a pneumatic elevator system having a pressure regulator to control airflow within an elevator shaft for control of cabin movement with the shaft.

BACKGROUND

A pneumatic vacuum elevator uses a suction mechanism such as a vacuum source to lift a passenger cabin vertically within a substantially sealed shaft. In some pneumatic elevators, downward travel of the cabin relies primarily or solely on gravity. However, for this process to function, the system needs a mechanism for controlling pressure both above and below the cabin so that the cabin may descend at a controlled and safe speed. If the pressure above and below the cabin is not suitably regulated by increasing or decreasing pressure above and below the cabin, the cabin will not move within the shaft, move at an undesirable or unsafe speed, and/or create dangerous or equipment damaging high pressures within the shaft, particularly during gravity descent.

Because the shaft is in large part a sealed tube, air/fluid conduits and/or vent holes are provided to allow air to enter and exit the shaft on either side end (top and bottom) of the cabin. For example, vent holes near the base of the shaft allow air within the shaft below the cabin to be pushed out of the shaft as the cabin descends and air to be drawn into the shaft as the cabin ascends. Similarly, vent holes at the top of the shaft allow air to enter as the cabin descends and exit the shaft above the cabin as it ascends. Without these vent holes, the cabin pushes the air into an enclosed space, pressurizing the air on either the top or the bottom of the cabin. The result is poorly controlled movement and possible damage due to overpressure of the shaft and/or the cabin. For safety reasons, efficient movement, reliability, and improved control of air flow into and from the shaft is desirable.

SUMMARY

The present invention relates to a valve that improves pressure control within an elevator shaft for a pneumatic elevator.

In an exemplary embodiment a pressure regulator includes a fluid transfer chamber defining one or more apertures, a flow control element disposed within the fluid transfer chamber and movable with respect to the fluid transfer chamber, and an actuator secured to the flow control element and operable to move the flow control element with respect to the fluid transfer chamber to control fluid flow through the apertures in the fluid transfer chamber.

The fluid transfer chamber can include a planar face that defines the plurality of apertures and the flow control element can include a planar face that is slidably disposed within the fluid transfer chamber co-planar with the planar face of the fluid transfer chamber. The flow control element can be disposed directly on the planar face of the fluid transfer chamber and the apertures of the flow control element can be aligned with the apertures of the fluid transfer chamber when the flow control element is moved to a first position. The apertures of the flow control element can be offset laterally with the apertures of the fluid transfer chamber, and the planar face of the flow control element can be in a spaced apart relationship with the planar face of the fluid transfer chamber.

The pressure regulator can be a part of a pneumatic elevator having a fluid transfer chamber with a planar face that defines apertures, a flow control element disposed within the fluid transfer chamber, the flow control element including a planar face that defines apertures and that is slidably disposed within the fluid transfer chamber co-planar with the planar face of the fluid transfer chamber, the apertures of the flow control element being offset laterally from the apertures of the fluid transfer chamber, and the planar face of the flow control element is in a spaced-apart relationship with the planar face of the fluid transfer chamber. An electrical solenoid can be secured to the flow control element and operable to move the flow control element with respect to the fluid transfer chamber.

A pneumatic vacuum elevator can include an elevator shaft, a cabin disposed within and movable within the elevator shaft, a vacuum source in fluid communication with the elevator shaft above the cabin, a pressure sensor in fluid communication with the elevator shaft above the cabin for measuring pressure within the elevator shaft above the cabin, a vent in fluid communication with the elevator shaft below the cabin for allowing fluid passage to and from the elevator shaft below the cabin, a pressure regulator in fluid communication with a point exterior to the elevator shaft and the elevator shaft above the cabin, wherein the pressure regulator controls fluid flow to the elevator shaft above the cabin, and a controller in electrical communication with the pressure sensor and the pressure regulator, the controller causing the pressure regulator to adjust fluid flow in response to a pressure measurement from the pressure sensor.

A cabin sensor can be provided that measures movement of the cabin with respect to the elevator shaft, the cabin sensor being in communication with the controller that causes the pressure regulator to adjust fluid flow in response to sensed movement of the cabin or sensed fluid flow through the pressure regulator. The pressure regulator includes can include a fluid transfer chamber defining apertures, a flow control element disposed within the fluid transfer chamber to cover and uncover the apertures, and an actuator secured to the flow control element and operable to move the flow control element with respect to the fluid transfer chamber to cover and uncover the apertures in the fluid transfer chamber.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

Figure 1A:
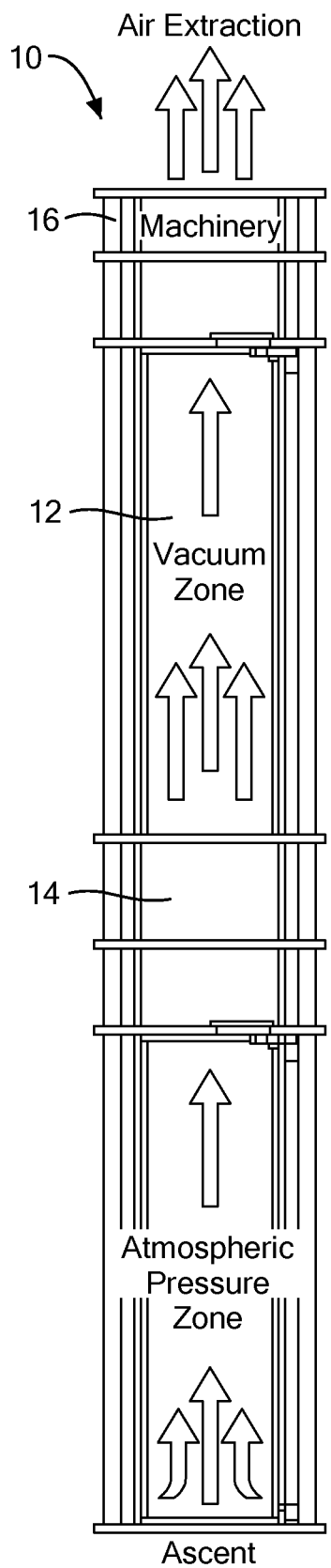
FIGS. 1A and 1B are simplified side views of a pneumatic vacuum elevator showing an elevator shaft, a cabin within the shaft, and airflow movement within the shaft.
Figure 1B:
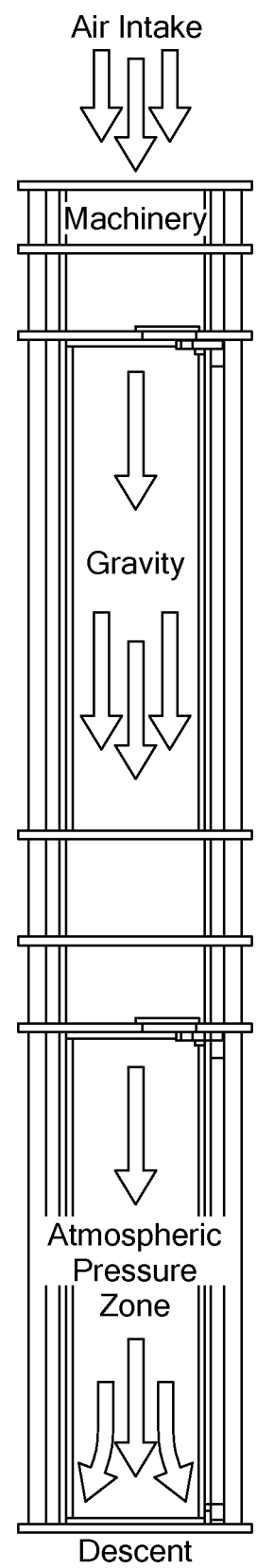

Referring now to FIGS. 1A and 1B, simplified side views of a pneumatic vacuum elevator 10 are shown. The pneumatic vacuum elevator includes an elevator shaft 12 and a cabin 14 within the shaft. Airflow movement within the shaft, intake and extraction or venting are shown by directional arrows. Airflow control machinery 16, described in greater deal with respect to FIG. 2, is shown near the top of the shaft.

Figure 2:
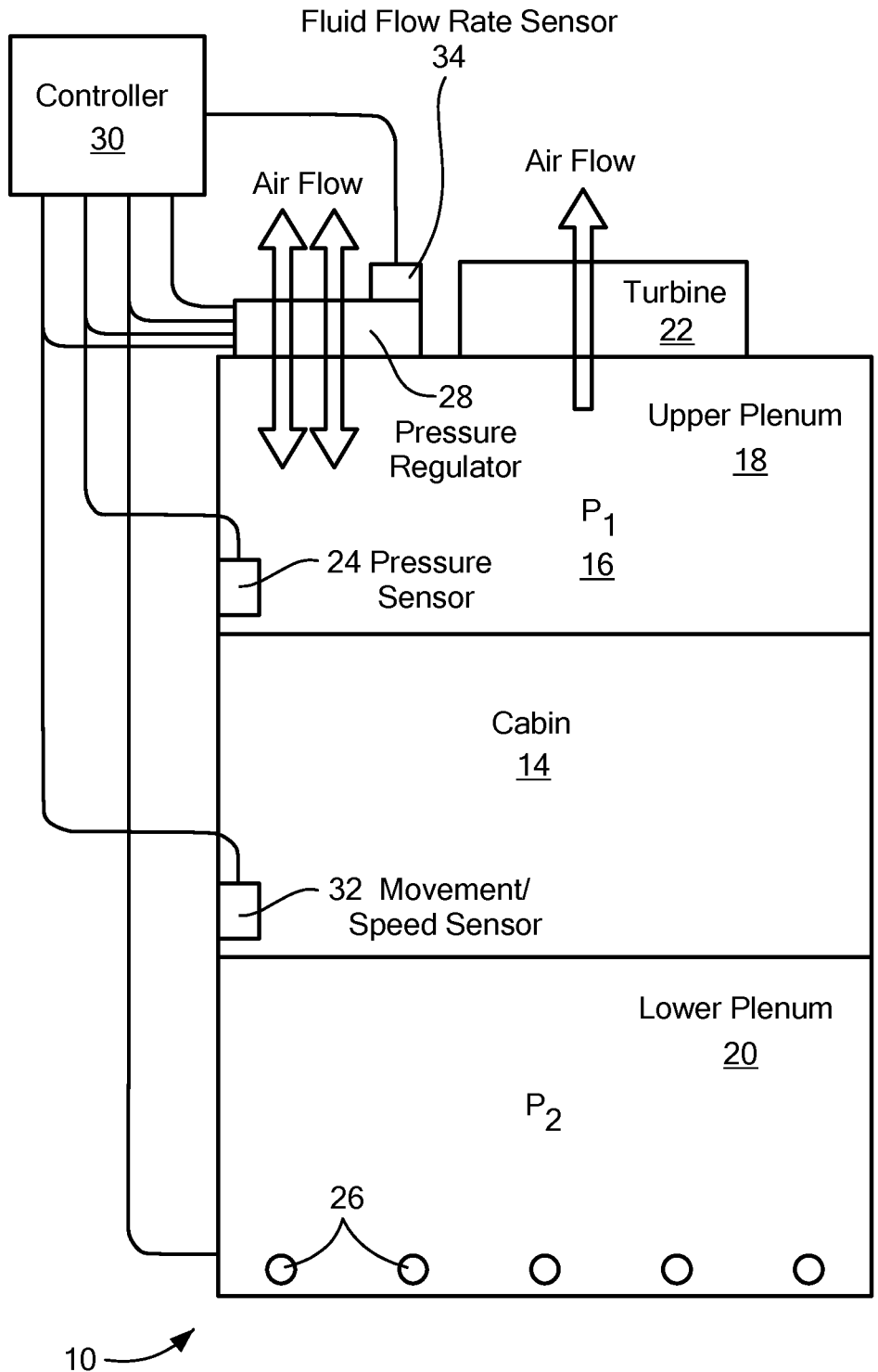
FIG. 2 is a simplified side view of the pneumatic vacuum elevator of FIGS. 1A and 1B showing additional structural features for airflow and pressure control.

FIG. 2 is a simplified side view of the pneumatic vacuum elevator 10 shown in FIGS. 1A and 1B depicting additional structural features for airflow and pressure control. In this view, the cabin 14 is positioned within the shaft 16. Seals (not shown) can be provided on the interior surface of the shaft or the exterior of the cabin to create an upper plenum 18 above the cabin 14 and a lower plenum 20 below the cabin. As the cabin 14 is movable within the shaft 16, the size of the upper plenum 18 and the lower plenum 20 change as the cabin moves up and down.

A vacuum source 22, such as a turbine, is in fluid communication with the elevator shaft 16 (upper plenum 18) above the cabin. The vacuum source can be positioned at the top of the shaft as shown, or remote from the shaft. A pressure sensor 24 is in fluid communication with the elevator shaft 16 above the cabin for measuring pressure within the elevator shaft above the cabin. A vent 26 is in fluid communication with the elevator shaft 16 below the cabin for allowing fluid passage to and from the elevator shaft below the cabin. The vent can take many forms including one or more holes, slots, tubes, or ducts.

A pressure regulator 28 is in fluid communication with a point exterior to the elevator shaft and the elevator shaft above the cabin (upper plenum 18). The pressure regulator 28 controls fluid (air) flow to the elevator shaft above the cabin 14 and is described in more detail with respect to FIGS. 3-6. A controller 30 is in electrical communication with the pressure sensor 24 and the pressure regulator 28. The controller 30 causes the pressure regulator 28 to adjust fluid flow in response to a pressure measurement from the pressure sensor 24.

Continuing to refer to FIG. 2, a cabin sensor 32 is shown that measures the movement of the cabin 14 with respect to the elevator shaft 16. The cabin sensor 32 is in communication with the controller 30, wherein the controller causes the pressure regulator 28 to adjust fluid flow in response to sensed movement of the cabin. Additionally, or alternatively, a fluid flow sensor 34 can be in communication with the controller 30, and the controller causes the pressure regulator to adjust fluid flow in response to sensed fluid flow through the pressure regulator.

Thus, in operation, to cause the cabin 14 to rise within the shaft 16, the pressure regulation components described above operate to allow air to enter the lower plenum 20 as the turbine 22 withdraws air from the upper plenum 18 (creating or applying a vacuum force). When descent of the cabin is desired, the turbine 22 lessens or stops applying a vacuum force to the upper plenum 18 until the weight of the cabin overcomes the pressure in the lower plenum allowing the cabin to descend. The pressure within the lower plenum is reduced by allowing air to flow from the vents 26. The speed of the cabin movement can be monitored by the speed sensor 32. To increase or decrease the rate of descent, the airflow through the pressure regulator 28 and the vents 26 can be increased or decreased by the controller.

Figure 3:
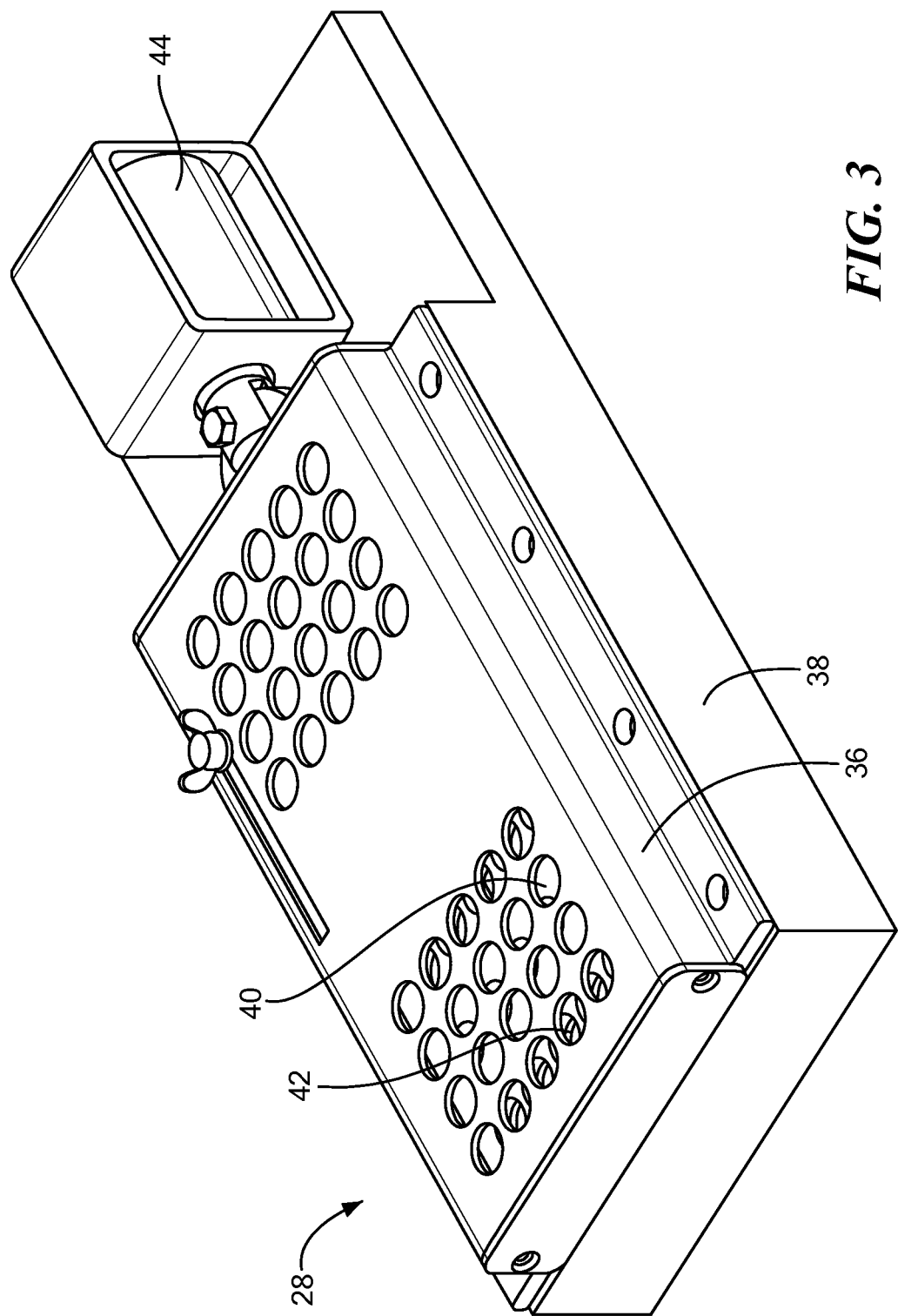
FIG. 3 is a perspective view of a pressure controller shown schematically in FIG. 2.
Figure 4:
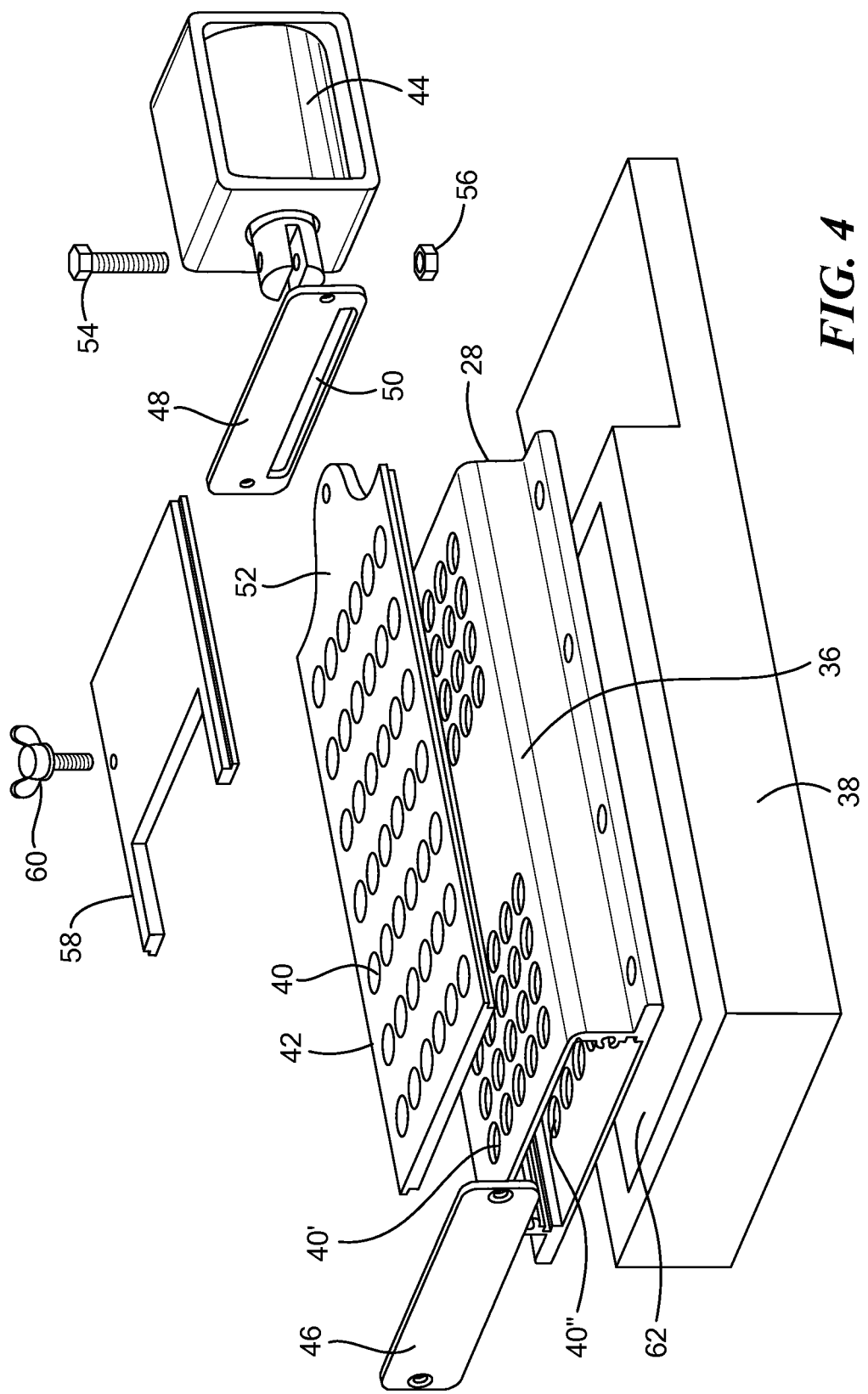
FIG. 4 is an exploded view of the pressure controller shown in FIG. 3.

Turning now to FIG. 3, a perspective view of an embodiment of the pressure regulator 28 is shown. A fluid transfer chamber 36, mounted to a base 38, defines apertures 40' on a first face as seen in FIG. 3 and a second face 40" as shown in FIG. 4. A flow control element 42 is disposed within the fluid transfer chamber 36 and is movable with respect to the fluid transfer chamber. An actuator 44 is secured to the flow control element 42 and is operable to move the flow control element with respect to the fluid transfer chamber to control fluid flow through the apertures in the fluid transfer chamber by covering and uncovering in whole or in part the apertures in the fluid transfer chamber. As shown, the actuator 44 is an electrical solenoid that moves linearly in and out to slide the flow control element 42 toward and away from the solenoid. It should be noted that the apertures on the front and back of the EVO body are not aligned. This is done to control air flow and to minimize noise caused by airflow through the apertures.

While the above discussion relates to control of fluid flow, wherein the fluid is air, the pressure regulator 28 can be used as a valve for control of fluids, wherein the fluids are liquids or combinations of liquids and gas. Exemplary liquids include oil, petrol, and water. The operation of the pressure regulator 28 is the same as described above, but the context or application may be different. For example, the pressure regulator 28 (valve) can be placed in-line in a system of pipe and tanks to control the flow of liquid through the pipes, to and from the tanks, etc. as desired by covering and uncovering in whole or in part the apertures in the fluid transfer chamber.

Referring now to FIG. 4, an exploded view of the pressure regulator 28 is shown including a first cover plate 46 for one end of the fluid transfer chamber 36 and second cover plate 48 defining a slot 50 through which an end portion 52 of the flow control element 42 can pass for connection to the actuator 44. A bolt 54 and nut 56 secure the end portion 52 to the actuator 44. An adjustable solid plate 58 is positioned to adjust airflow through the pressure regulator 28. The more air that is allowed in, the faster the cabin descends. Conversely, the less air that is allowed in, the slower the cabin will descend. This solid adjustable plate 58 can be held in place with a butterfly screw 60. The solenoid 44 moves the flow control element 42 exposing apertures 40, 40', and 40". The base 38 defines a passage through which air passes to and from apertures 40." Also, the base can serve as a mount for the pressure regulator 28 within the elevator shaft as illustrated in FIG. 2, wherein the pressure regulator is shown secured at the top of the upper plenum 18.

Figure 5:
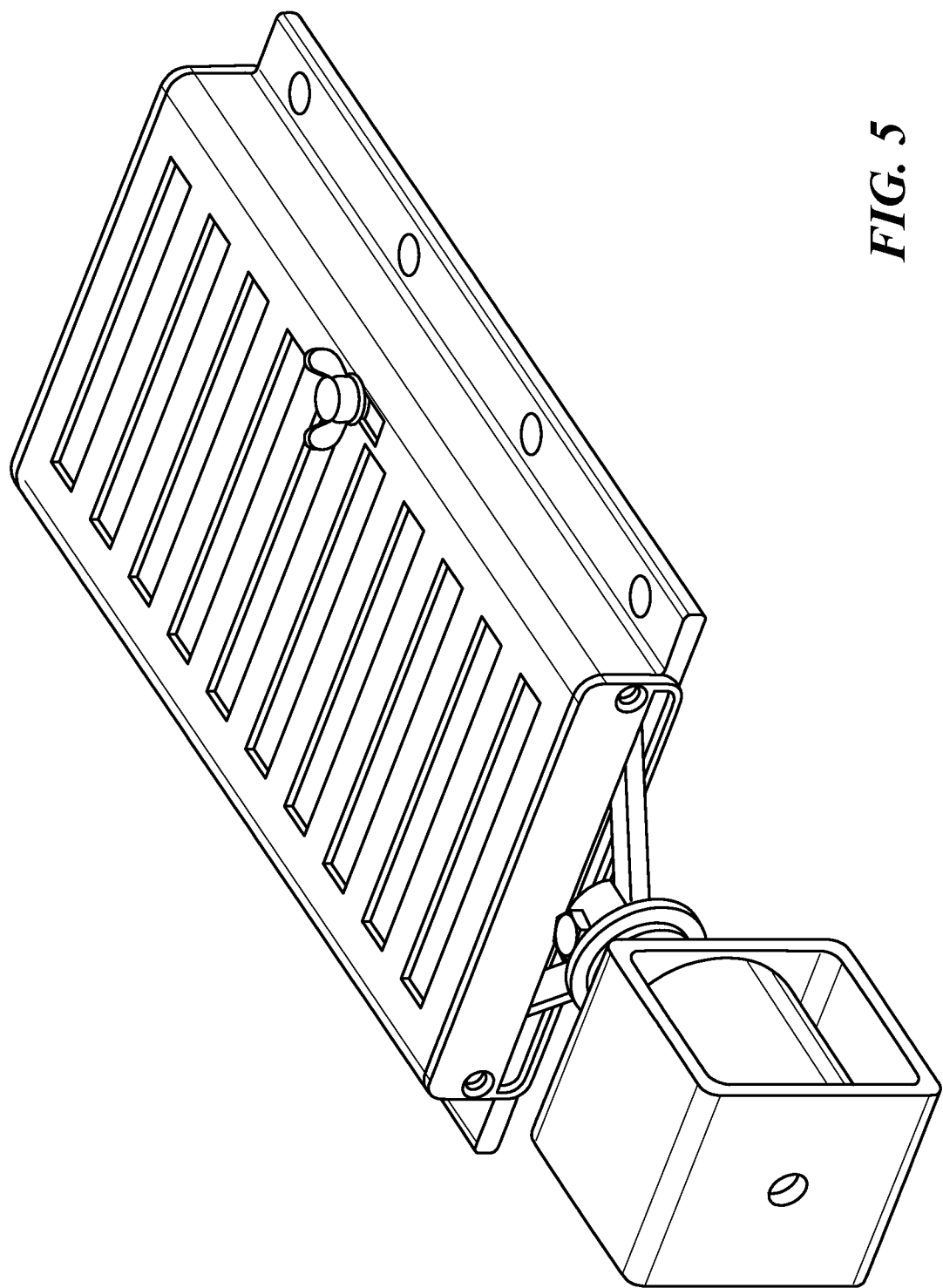
FIG. 5 is a perspective view of the pressure controller of FIG. 2 showing a different configuration for apertures.
Figure 6:
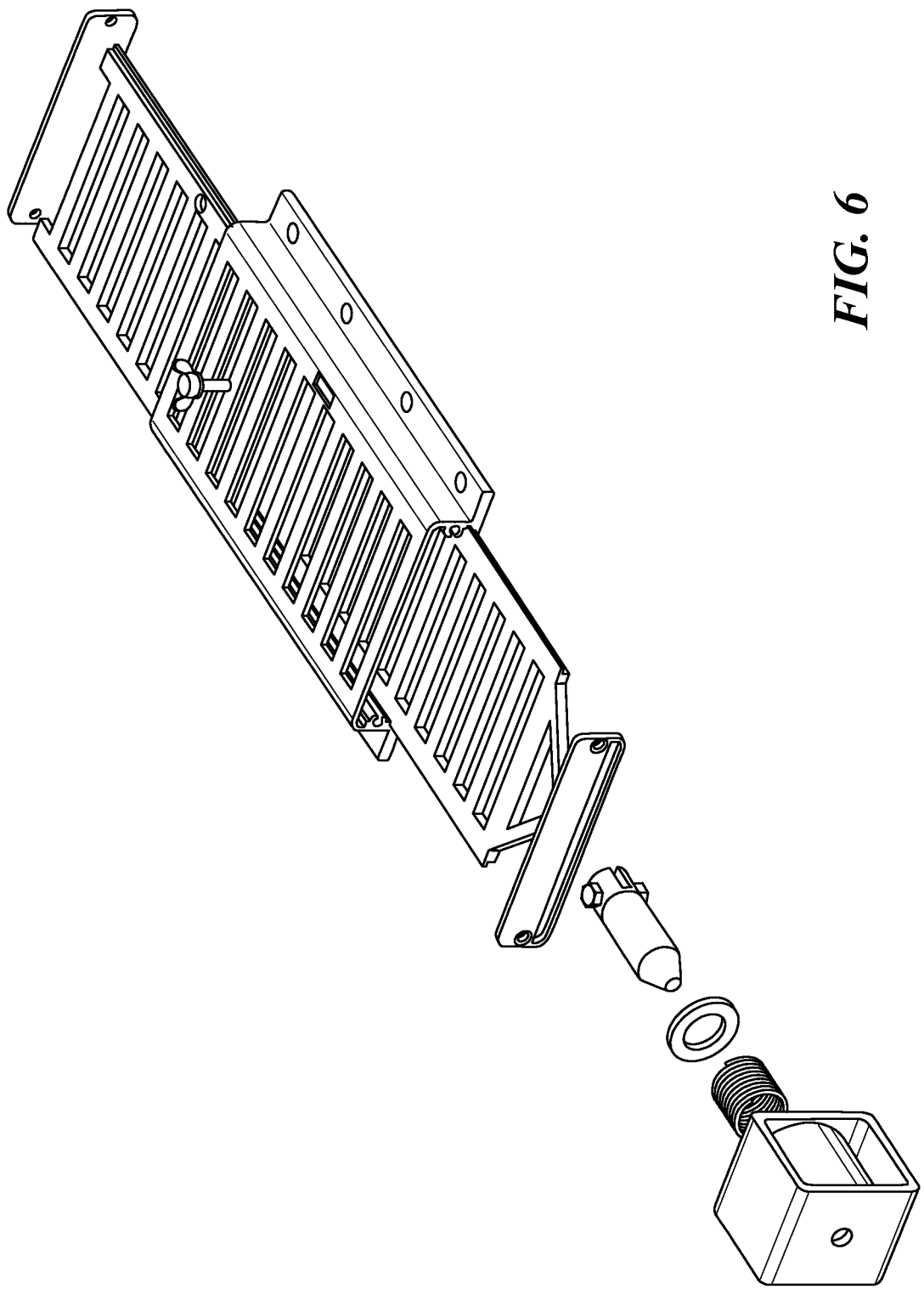
FIG. 6 is an exploded view of the pressure controller shown in FIG. 5.

FIG. 5 is a perspective view of the pressure controller of FIG. 2 showing a different configuration for apertures; and FIG. 6 is an exploded view of the pressure controller shown in FIG. 5.

As with the embodiment shown in FIG. 3, the flow control element includes a planar face that is slidably disposed within the fluid transfer chamber co-planar with the planar face of the fluid transfer chamber, wherein the flow control element defines a plurality of apertures.

The flow control element can be disposed directly on the planar face of the fluid transfer chamber (or in a spaced apart relationship) so that the apertures of the flow control element are aligned or misaligned (laterally offset) with the apertures of the fluid transfer chamber when the flow control element is moved to a first position.

It should be understood that various aspects disclosed herein may be combined in different combinations than the combinations specifically presented in the description and accompanying drawings.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A pneumatic vacuum elevator, comprising:
   an elevator shaft;
   a cabin disposed within and movable within the elevator shaft;
   a vacuum source in fluid communication with the elevator shaft above the cabin;
   a pressure sensor in fluid communication with the elevator shaft above the cabin for measuring pressure within the elevator shaft above the cabin;
   a vent in fluid communication with the elevator shaft below the cabin for allowing fluid passage to and from the elevator shaft below the cabin;
   a pressure regulator including a fluid transfer chamber and a flow control element in fluid communication with a point exterior to the elevator shaft and the elevator shaft above the cabin, wherein the pressure regulator controls fluid flow to the elevator shaft above the cabin; and
   a controller in electrical communication with the pressure sensor and the pressure regulator, the controller causing the pressure regulator to adjust fluid flow in response to a pressure measurement from the pressure sensor;
   the fluid transfer chamber having a planar face that defines a plurality of apertures;
   the flow control element disposed within the fluid transfer chamber, the flow control element including a planar face that defines a plurality of apertures and that is slidably disposed within the fluid transfer chamber, the plurality of apertures of the flow control element are offset laterally from the plurality of apertures of the fluid transfer chamber, and the planar face of the flow control element is in a spaced-apart relationship with the planar face of the fluid transfer chamber; and
   an electrical solenoid secured to the flow control element and operable to move the flow control element with respect to the fluid transfer chamber.

2. The pneumatic vacuum elevator of claim 1, further comprising:
   a cabin sensor that measures movement of the cabin with respect to the elevator shaft, the cabin sensor in communication with the controller, the controller causing the pressure regulator to adjust fluid flow in response to sensed movement of the cabin.

3. The pneumatic elevator of claim 1, further comprising:
   a fluid flow sensor in fluid communication with the pressure regulator for measuring fluid flow through the pressure regulator, the fluid flow sensor in communication with the controller, the controller causing the pressure regulator to adjust fluid flow in response to sensed fluid flow through the pressure regulator.

4. The pneumatic vacuum elevator of claim 1, further comprising:
   a cabin sensor that measures movement of the cabin with respect to the elevator shaft, the cabin sensor in communication with the controller, the controller causing the pressure regulator to adjust fluid flow in response to sensed movement of the cabin; and
   a fluid flow sensor in fluid communication with the pressure regulator for measuring fluid flow through the pressure regulator, the fluid flow sensor in communication with the controller, the controller causing the pressure regulator to adjust fluid flow in response to sensed fluid flow through the pressure regulator.

* * * * *